(12) United States Patent
Sharma et al.

(10) Patent No.: US 6,747,843 B2
(45) Date of Patent: Jun. 8, 2004

(54) RAMP DESIGN FOR REDUCING READ-WRITE HEAD TRACK POSITIONING ERRORS

(75) Inventors: Vinod Sharma, Los Gatos, CA (US); Joseph Chang, Cupertino, CA (US); Hyung Jai Lee, San Jose, CA (US)

(73) Assignee: Samsung Electronics Co., LTD, Suwon (KR)

( * ) Notice: Subject to any disclaimer, the term of this patent is extended or adjusted under 35 U.S.C. 154(b) by 80 days.

(21) Appl. No.: 10/107,387

(22) Filed: Mar. 26, 2002

(65) Prior Publication Data

US 2003/0184913 A1 Oct. 2, 2003

(51) Int. Cl.[7] ................................................. G11B 5/54
(52) U.S. Cl. ..................... 360/128; 360/254.4
(58) Field of Search ..................... 360/254.4–254.8, 360/97.01–97.04, 128

(56) References Cited

U.S. PATENT DOCUMENTS

| | | | | |
|---|---|---|---|---|
| 5,625,514 A | * | 4/1997 | Kubo et al. | |
| 5,764,437 A | * | 6/1998 | Meyer et al. | |
| 6,091,576 A | * | 7/2000 | Eckerd et al. | |
| 6,163,438 A | * | 12/2000 | Kajitani | 360/245.7 |
| 6,226,155 B1 | * | 5/2001 | Watanabe et al. | 360/254.8 |
| 6,307,716 B1 | * | 10/2001 | Hamaguchi et al. | 360/254.4 |

* cited by examiner

Primary Examiner—Allen Cao
(74) Attorney, Agent, or Firm—Gregory Smith & Associates; Jeffrey P. Aiello; Earle Jennings

(57) ABSTRACT

The invention includes a method of A wipping part of the load ramp is a convex finger crossing the read-write head path of motion with respect to a lifting tab engagably moving across the loading ramp.

14 Claims, 5 Drawing Sheets

RAMP DESIGN FOR REDUCING READ-WRITE HEAD TRACK POSITIONING ERRORS

TECHNICAL FIELD

This invention relates to ramps used to park read-write head sliders in disk drives.

BACKGROUND ART

Disk drives are an important data storage technology based on several crucial components including disk media surfaces and read-write heads. When in operation, the rotation of disk media surfaces, with respect to the read-write heads, causes each read-write head to float a small distance off the disk media surface it accesses.

When the disk media surface is not rotating with respect to the read-write head, mechanical vibrations acting upon the disk drive can cause the read-write head to collide with the disk media surface, unless they are separated.

This separation is often referred to as "parking" the read-write heads. Parking the read-write heads minimizes the possibility of damaging the disk media surfaces and/or the read-write heads due to these mechanical collisions. Often such parking mechanisms include a ramp, on which the head slider(s) are "parked", and a latch mechanism.

When the disk media surfaces are rotating, the read-write head(s) are very close to the disk media and they often pickup traces of the lubricants used in the disk drive. These traces of lubricant degrade the ability of a read-write head to access the disk media surface.

FIG. 1A illustrates a typical prior art high capacity disk drive 10 including actuator arm 30 with voice coil 32, actuator axis 40, suspension or head arms 50–58 with slider/head unit 60 placed among the disks.

FIG. 1B illustrates a typical prior art high capacity disk drive 10 with magnet actuator 20, actuator arm 30 with voice coil 32, actuator axis 40, head arms 50–54 and Head Suspension Assemblies (HSA's) 60–66 with the disks removed.

Since the 1980's, high capacity disk drives 10 have used voice coil actuators 20–66 to position their read/write heads over specific tracks. The heads are mounted on head sliders at the far end of HSA's 60–66 from the voice coil 32. The heads float a small distance off the disk drive surface 12 when in operation. Often there is one head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–54 positioning head slider units 60–66 over specific tracks with remarkable speed and accuracy. Actuator arms 30 are often considered to include voice coil 32, actuator axis 40, head arms 50–54 and HSA's 60–66. Note that actuator arms 30 may have as few as a single head arm 50. Note also that a single head arm 52 may connect with two HSAs 62 and 64.

FIG. 2A illustrates a Contact Start Stop (CSS) actuator arm 30 of the prior art.

A magnet is affixed to the tail end of the voice coil 32 region, which when near a second magnet located in either the top yoke or bottom yolk of the fixed magnet region 20, will tend to attract actuator 30 to a parking site often inside the disk media. Magnetic latches are used with CSS designs.

The outside disk surface approach to parking read-write heads parks the read-write head or heads on a ramp outside the disk surface, removing and/or minimizing the possibility for contact when the disk is not in operation.

Read-write heads must be positioned very accurately over the track in the disk media surface they are to access. Errors in this activity are known as track positioning errors, triggering a Position Error Signal (PES).

For a CSS drive, the lubricant pickup by the read-write head(s) during the track seeking process results in a phenomena known as "flying stiction". Flying stiction may lead to experiencing a high stiction force at the mechanical interface of the read-write head and the disk media surface. The high stiction force at the mechanical interface between the read-write head and the disk media surface may lead to track positioning errors.

FIG. 2B illustrates an actuator arm 30 including head suspension assembly 60 with head slider 90 on ramp 100 for a parking mechanism outside the disk media surface 12 (not shown), as found in the prior art.

FIG. 3 illustrates a prior art loading ramp 100 engaging lifting tab 92 coupled with head slider 90 by a head suspension assembly 60 positioning the read-write head of head slider 90 in a parking zone with lifting tab 92 engaging loading ramp 100 in region 104.

To park the read-write head, the head suspension assembly 60 moves from the left, with lifting tab 92 engaging the loading ramp at engagement region 102 and proceeding to region 104. This places the read-write head 90 into its parking zone.

Block 106 acts to limit lifting tab 92 and, therefore, the read-write head of slider 90, from moving upward, while region 104 acts to limit lifting tab 92 and the read-write head of slider 90 from moving downward. The rising sections on either side of region 104 further act to limit accidental movement of lifting tab 92 and the coupled head slider 90 in the horizontal directions.

Region 108 of loading ramp 100 is often used during the assembly of a disk drive in a fashion similar to engagement region 102. Movement of lifting tab 92 is from the right engaging loading ramp 100 at 108 and proceeding to region 104 to park the read-write head.

For a ramp loading disk drive, the read-write head(s) do not rest on the media 12 during the start and stop operations of the disk drive. A central advantage to such disk drives is improved mechanical shock resistance. Improved shock resistance increases the durability and life expectancy of the disk drive.

However, ramp-loading disk drives also present some new problems. Any lubricant that is picked up by the read-write head is more likely to stay on the read-write head, rather than get smeared on the disk media.

Lubricants migrate due to disk rotation onto the disk media surface. After a time, some of the migrated lubricant enters the mechanical interface between the read-write head and the disk media surface, making contact, and sticking to the read-write head. When this occurs, the read-write head tends to stick to the disk media surface, which is known as lubricant stiction. Lubricant stiction is a known cause of track positioning errors. In extreme cases, lubricant stiction acts as a glue between the read-write head and the disk media surface, preventing the disk media surface from rotating at the proper speed. Sometimes the disk media surface cannot rotate at all.

Lubricant stiction is likely to become more pronounced as the flying height of the read-write heads over the disk media surface decreases. Therefore, track positioning errors from lubricant stiction are likely to increase as the flying height decreases.

To summarize, what is needed is a method and/or apparatus removing at least some of the lubricant picked up by a read-write head for a ramp loading disk drive.

SUMMARY OF THE INVENTION

The invention solves at least all the problems discussed for ramp loading disk drives.

The invention includes a method of wiping a read-write head on a ramp including the following. Loading the read-write head into a parking region based upon the lifting tab engaging the loading ramp. Wiping the read-write head on a wiping part of the loading ramp when the lifting tab engages the loading ramp and when the read-write head is outside in the parking region. Note that the wiping part is a convex finger crossing the read-write head path of motion with respect to the lifting tab engagably moving across the loading ramp.

The invention includes a loading ramp for a read-write head coupled to a lifting tab by a head suspension assembly. The loading ramp includes the following. A lifting tab path for engaging the lifting tab to create a motion path for the read-write head based upon the lifting tab engagably moving along the lifting tab path. A convex finger contacting the motion path of the read-write head provides a wiping of the read-write head. Note that the motion path for the read-write head includes a parking region and the convex finger contacts the motion path outside the parking region.

When the read-write head is at least partially covered with a lubricant drop providing a lubricant drop surface, the convex finger contacting the motion path of the read-write head comes within a distance of the read-write head motion path. The convex finger, by approaching close to the read-write head motion path, breaks the lubricant drop surface, providing the wiping of the read-write head.

The invention also includes disk drives containing the loading ramp and the head suspension assembly.

Note that the loading ramp 2002 may be located outside the disk media surface or inside the disk media surface. When a disk drive contains more than one disk media surface, the loading ramp is preferably located outside the disk media surface. However, when the disk drive contains one disk media surface, it may be preferable to locate the loading ramp inside the disk media surface.

Locating the loading ramp inside the disk media surface refers to positioning the loading ramp over the disk media surface. This alternative to CSS disk drive parking has the advantage of greater mechanical shock resistance without the problem of lubricant buildup.

Note that the convex fingers are approximately convex. The convex fingers may approximate an elliptical cylinder, ellipsoid, paraboloid, cylinder, or hemisphere in different embodiments of the invention.

These and other advantages of the present invention will become apparent upon reading the following detailed descriptions and studying the various figures of the drawings.

DETAILED DESCRIPTION OF THE INVENTION

The invention includes a loading ramp for a read-write head coupled to a lifting tab by a head suspension assembly. The loading ramp includes the following. A lifting tab path for engaging the lifting tab to create a motion path for the read-write head based upon the lifting tab engagably moving along the lifting tab path. A convex finger contacts the motion path of the read-write head to provide a wiping of the read-write head. Note that the motion path for the read-write head includes a parking region and the convex finger contacts the motion path outside the parking region.

When the read-write head is at least partially covered with a lubricant drop providing a lubricant drop surface, the convex finger contacting the motion path of the read-write head comes within a distance of the read-write head motion path. The convex finger, by approaching close to the read-write head motion path, breaks the lubricant drop surface, providing the wiping of the read-write head.

Figure 4:
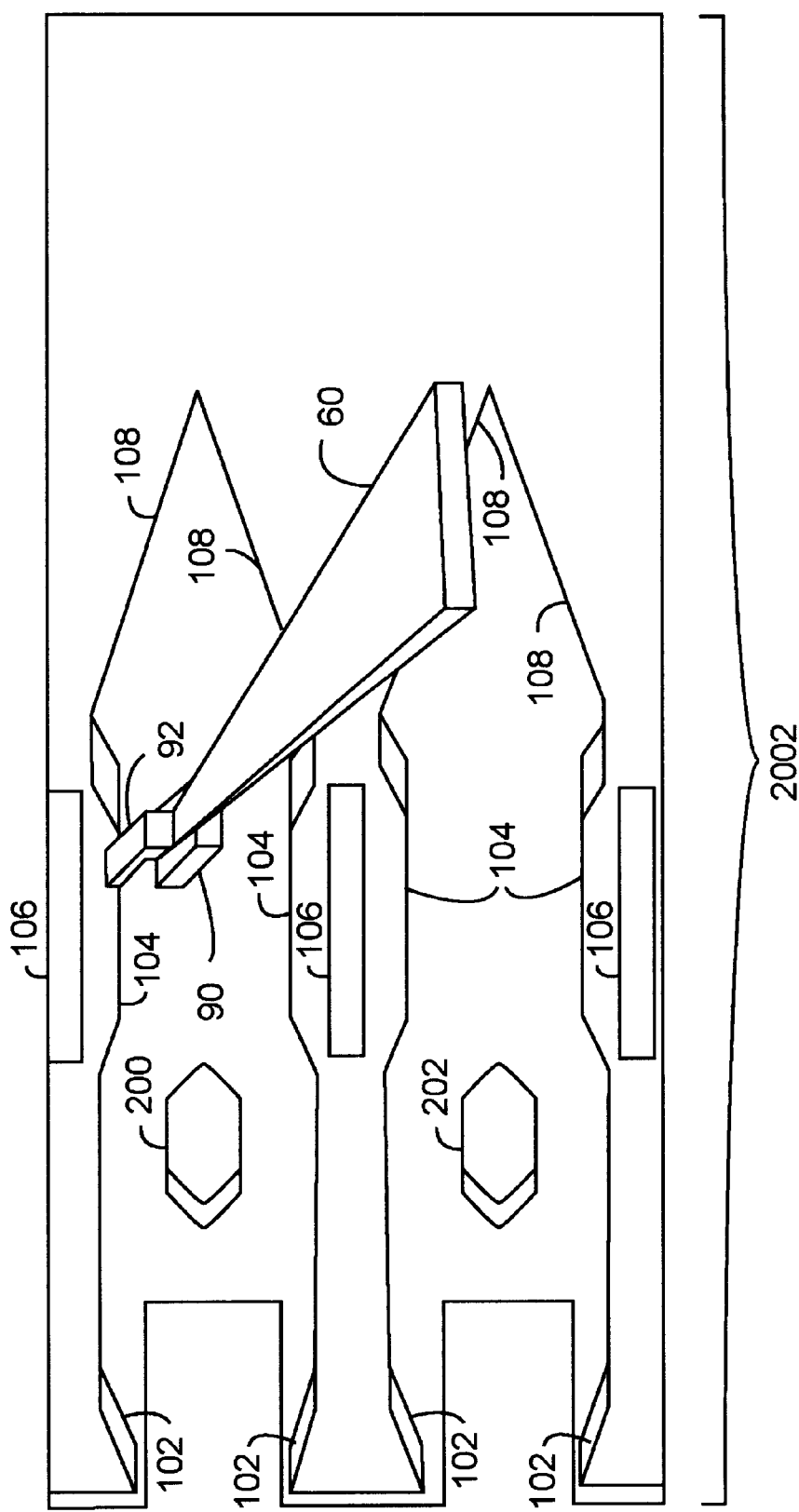
FIG. 4 illustrates a loading ramp 2002 including convex fingers 200 and 202 position outside and to the left of the parking zone of the read-write head of slider 90, in accordance with the invention.

FIG. 4 illustrates a loading ramp 2002 including convex fingers 200 and 202 positioned outside and to the left of the parking zone of the read-write head of slider 90, in accordance with the invention.

Figure 5:
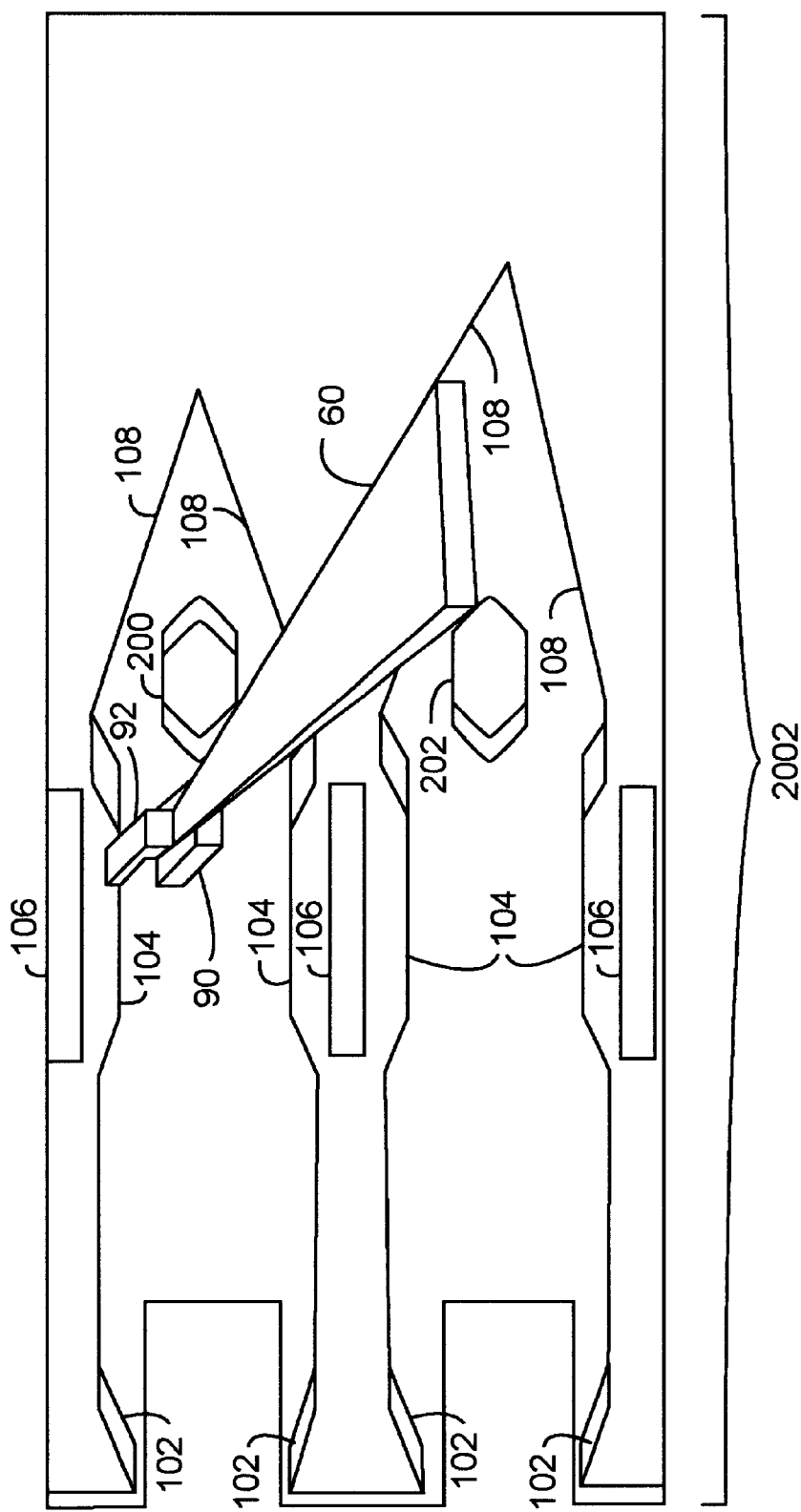
FIG. 5 illustrates a loading ramp 2002 including convex fingers 200 and 202 position outside and to the right of the parking zone of the read-write head of slider 90, in accordance with the invention.

FIG. 5 illustrates a loading ramp 2002 including convex fingers 200 and 202 positioned outside and to the right of the parking zone of the read-write head of slider 90, in accordance with the invention.

Note that in both FIGS. 4 and 5, the lifting tab path from 102 to 104, engaging lifting tab 92, creates a motion path for the read-write head in slider 90 based upon engaged lifting tab 92 moving along lifting tab path.

Note that in both FIGS. 4 and 5, convex finger 200 contacts the read-write head motion path, wiping the read-write head.

In FIG. 4, convex fingers 200 and 202 contact the read-write head every time the read-write head is parked.

In FIG. 5, parking the read-write head does not bring the read-write head into contact with convex fingers 200 and 202. FIG. 5 illustrates a loading ramp 2002 wherein the actuator occasionally directs lifting tab 92 further than required for parking to bring convex finger into contact with the motion path of the read-write head of the head slider 90 coupled to lifting tab 92.

Figure 3:
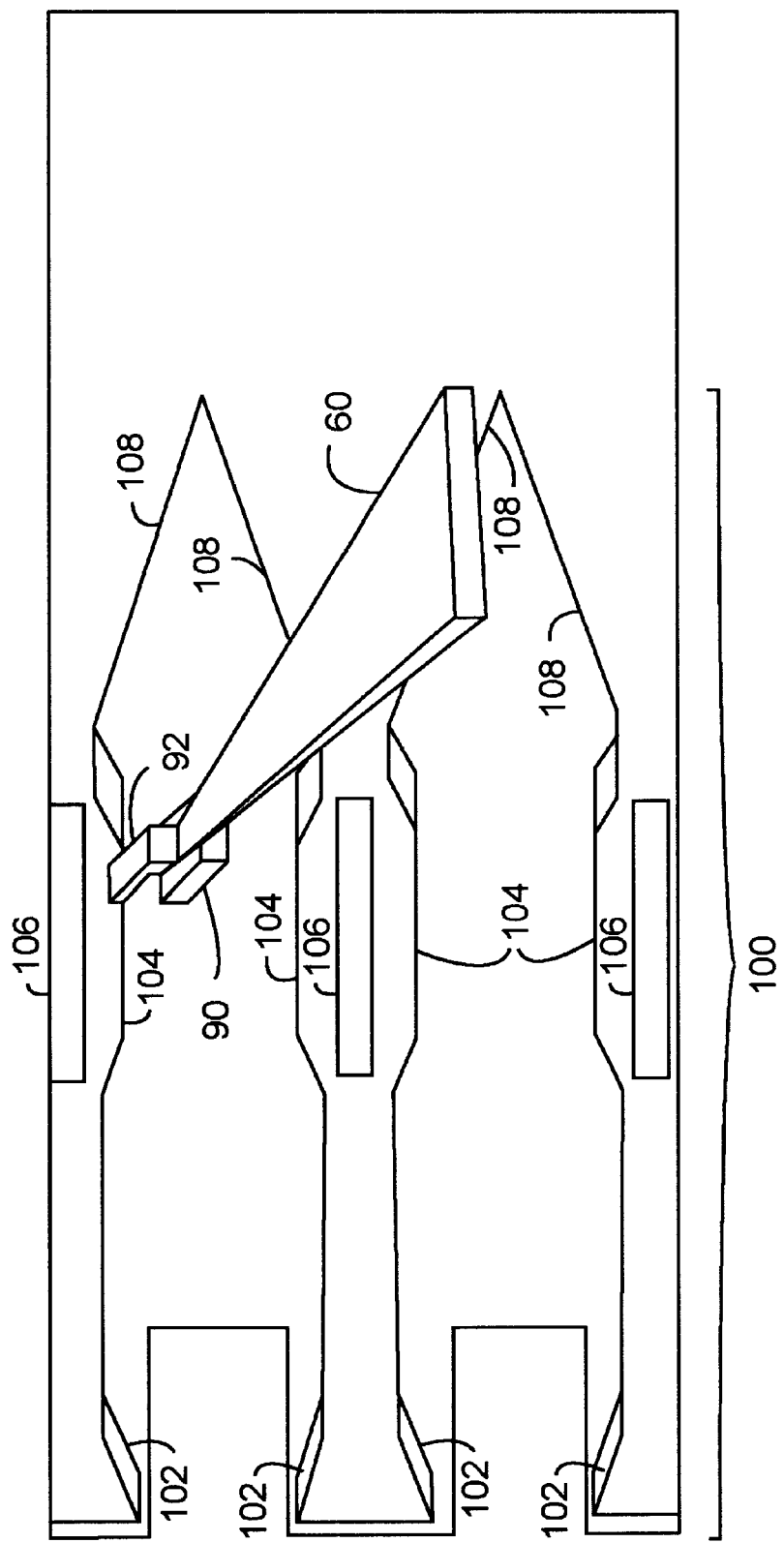
FIG. 3 illustrates a prior art loading ramp 100 engaging lifting tab 92 coupled with head slider 90 by a head suspension assembly 60, positioning the read-write head of head slider 90 in a parking zone under block 104.

In FIGS. 3, 4 and 5, loading ramp 2002 engages lifting tab 92 coupled with head slider 90 by a head suspension assembly 60 positioning the read-write head of head slider 90 in a parking zone with lifting tab 92 engaging loading ramp 100 in region 104.

In FIGS. 3, 4 and 5, to park the read-write head, the head suspension assembly 60 moves from the left, with lifting tab 92 engaging the loading ramp at engagement region 102 and proceeding to region 104. This places the read-write head of slider 90 into its parking zone.

In FIGS. 3, 4 and 5, block 106 acts to limit lifting tab 92 and therefore, the read-write head of slider 90, from moving upward, while region 104 acts to limit lifting tab 92 and the read-write head of slider 90 from moving downward. The rising sections on either side of region 104 further act to limit accidental movement of lifting tab 92 and the coupled head slider 90 in the horizontal directions.

In FIGS. 3, 4 and 5, region 108 of loading ramp 100 is often used during the assembly of a disk drive in a fashion similar to engagement region 102. Movement of lifting tab 92 is from the right engaging loading ramp 100 at 108 and proceeding to region 104 to park the read-write head.

The invention includes a method of wiping a read-write head on a loading ramp 2002 including the following. Loading the read-write head into a parking region based upon the lifting tab 90 engaging the loading ramp 2002 from 102 through 104. And wiping the read-write head on a wiping part 200 of the loading ramp 2002 when the lifting tab 92 engages the loading ramp and when the read-write head is outside in the parking region.

Note that the wiping part is a convex finger crossing the read-write head path of motion with respect to the lifting tab engagably moving across the loading ramp. Also note that different head suspension assemblies 60 will tend to differ in the motion paths of the read-write heads on the slider 90 coupled to lifting tab 92.

Therefore, the inventive loading ramp 2002 will be preferably designed with specifically parameterized head suspension assemblies 60 constraining the motion path of the read-write head with respect to the motion of lifting tab 92 engaging the loading ramp.

Figure 1A:
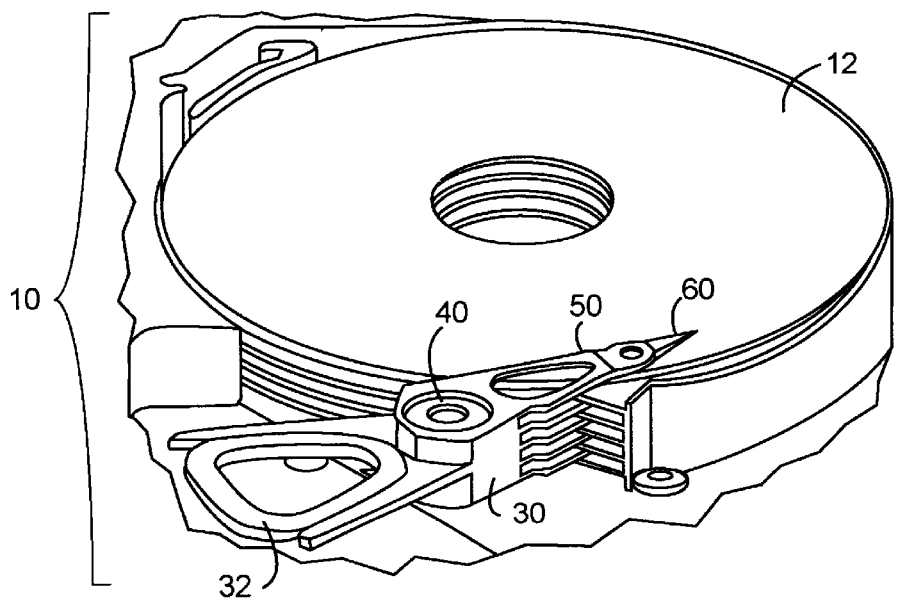
FIG. 1A illustrates a typical prior art high capacity disk drive 10 including actuator arm 30 with voice coil 32, actuator axis 40, suspension or head arms 50–58 with slider/head unit 60 placed among the disks.
Figure 1B:
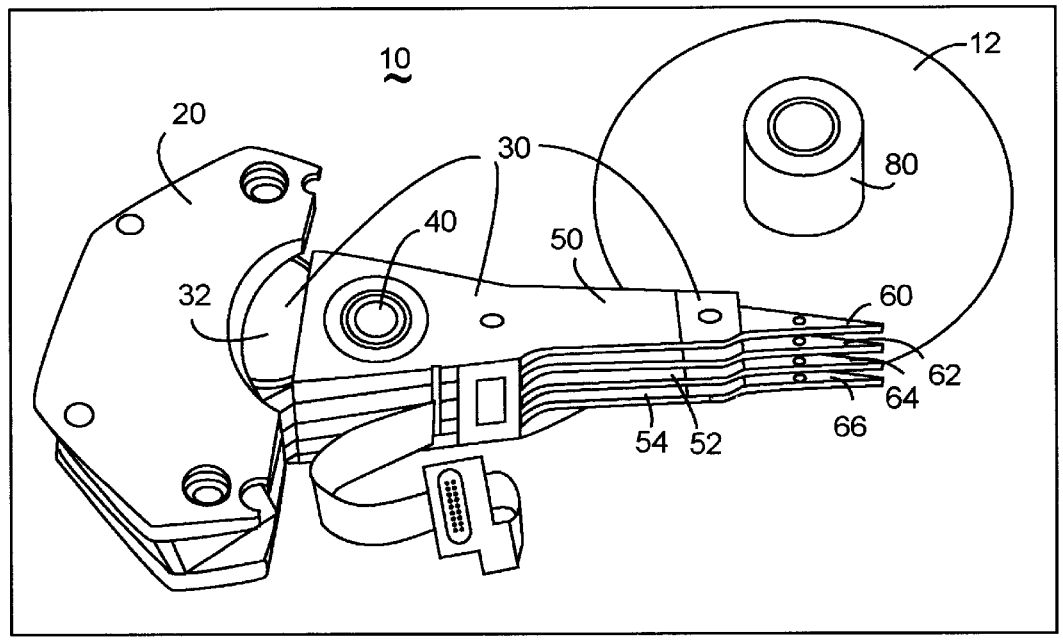
FIG. 1B illustrates a typical prior art high capacity disk drive 10 with actuator 20, actuator arm 30 with voice coil 32, actuator axis 40, head arms 50–56 and Head Suspension Assemblies (HSA's) 60–66 with the disks removed.
Figure 2A:
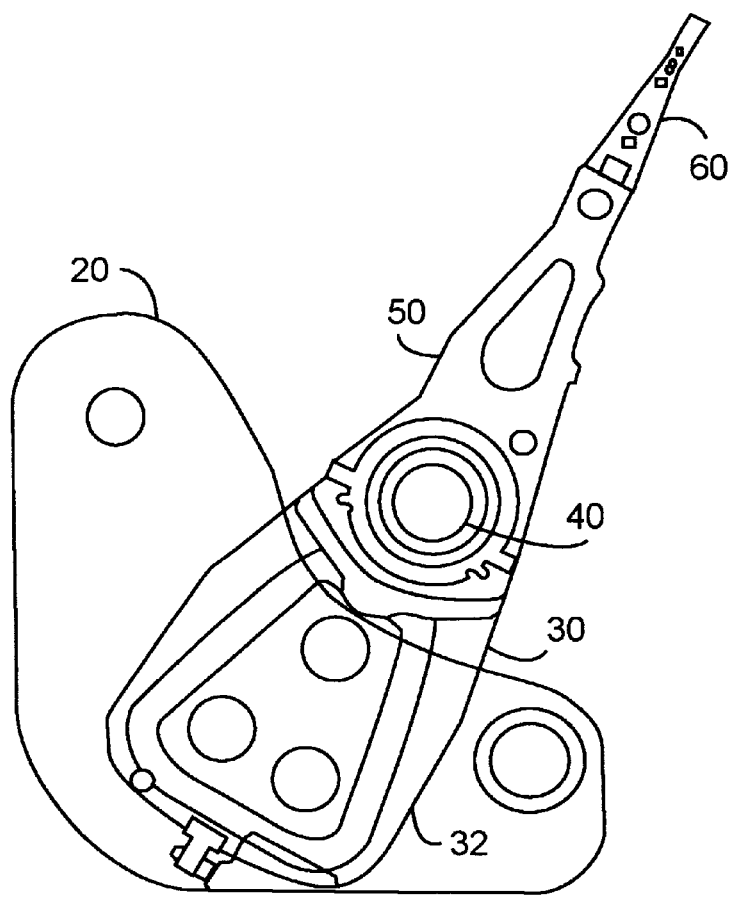
FIG. 2A illustrates a Contact Start Stop (CSS) actuator arm 30 of the prior art.
Figure 2B:
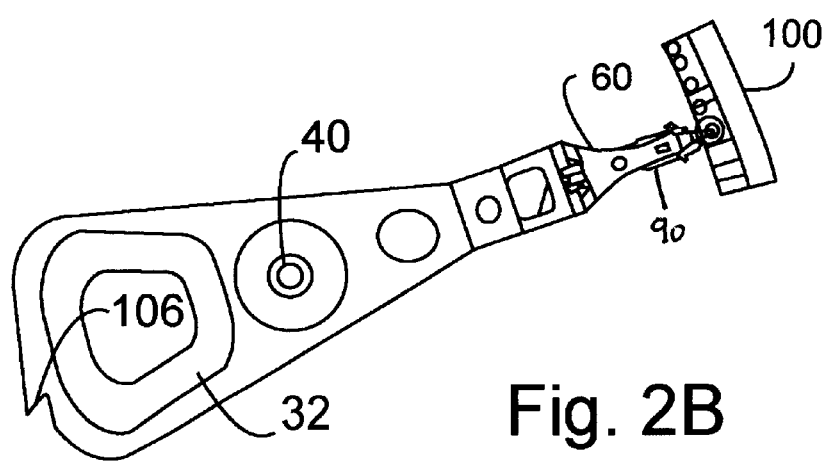
FIG. 2B illustrates an actuator arm 30 including head suspension assembly 60 with head slider 90 on ramp 100 for a parking mechanism outside the disk media surface 12 (not shown), as found in the prior art.

FIGS. 4 and 5 show loading ramps 2002 which can accommodate up to four head suspension assemblies 60–66, even though only one head suspension assembly 60 has been illustrated. These Figures portray a preferred embodiment economically wiping the read-write heads of an actuator including up to four head suspension assemblies as illustrated in FIGS. 1A and 1B.

Note that other preferred loading ramps may service as few as one head suspension assembly. Note that other preferred loading ramps may service more than four head suspension assemblies.

The preceding embodiments have been provided by way of example and are not meant to constrain the scope of the following claims.

What is claimed is:

1. A loading ramp for a read-write head coupled to a lifting tab by a head suspension assembly, comprising:
    a lifting tab path for engaging said lifting tab to create a motion path for said read-write head based upon said lifting tab engagably moving along said lifting tab path;
    a convex finger contacting said motion path of said read-write head to provide a wiping of said read-write head;
    wherein said motion path for said read-write head includes a parking region; and
    wherein said convex finger contacting said motion path outside said parking region;
    wherein said head suspension assembly is contained in an actuator accessing at least one disk media surface; and
    wherein said loading ramp is located outside said disk media surface;
    wherein said read-write head is at least partially covered with a lubricant drop providing a lubricant drop surface;
    wherein said convex finger contacting said motion path of said read-write head is further comprised of:
        said motion path of said read-write head approaching within a distance of said convex finger breaks said lubricant drop surface to provide said wiping of said read-write head.

2. The apparatus of claim 1,
    wherein said convex finger contacting said motion path is located between said parking region and said disk media surface.

3. The apparatus of claim 1,
    wherein said parking region is located between said convex finger contacting said motion path and said disk media surface.

4. A disk drive, comprising:
    said loading ramp of claim 1;
    said head suspension assembly; and
    said actuator controlling movement of said head suspension assembly over a said disk media surface to support said disk drive accessing said disk media surface via said read-write head;
    wherein said loading ramp is used to park said read-write head in said parking zone.

5. A method of wiping a read-write head mechanically coupled to a lifting tab on a head suspension assembly on a loading ramp in a disk drive, comprising the steps of:
    loading said read-write head into a parking region based upon said lifting tab engaging said loading ramp;
    wiping said read-write head on a wiping part of said loading ramp when said lifting tab engages said loading ramp and when said read-write head is outside in said parking region; and
    wherein said wiping part is a convex finger crossing said read-write head path of motion with respect to said lifting tab engagably moving across said loading ramp;
    wherein said read-write head is at least partially covered with a lubricant drop providing a lubricant drop surface;
    wherein said convex finger contacting said motion path of said read-write head is further comprised of:
        said motion path of said read-write head approaching within a distance of said convex finger breaks said lubricant drop surface to provide said wiping of said read-write head; and
    wherein said disk drive contains said head suspension assembly and said loading ramp.

6. The method of claim 5,
    wherein the step of loading said read-write head into said parking region occurs after the step wiping said read-write head.

7. The method of claim 5,
wherein the step of loading said read-write head into said parking region occurs before the step wiping said read-write head.

8. A loading ramp for a read-write head coupled to a lifting tab by a head suspension assembly, comprising:
a lifting tab path for engaging said lifting tab to create a motion path for said read-write head based upon said lifting tab engagably moving along said lifting tab path;
wherein said read-write head is at least partially covered with a lubricant drop providing a lubricant drop surface;

a convex finger contacting said motion path of said read-write head to provide a wiping of said read-write head, is further comprised of:
said motion path of said read-write head approaching within a distance of said convex finger to provide said wiping of said read-write head, is further comprised of:
said motion path of said read-write head approaching within said distance of said convex finger breaks said lubricant drop surface to provide said wiping of said read-write head;
wherein said motion path for said read-write head includes a parking region; and
wherein said convex finger contacts said motion path outside said parking region.

9. The apparatus of claim 8,
wherein said head suspension assembly is contained in an actuator accessing at least one disk media surface; and
wherein said loading ramp is located outside said disk media surface.

10. The apparatus of claim 9,
wherein said convex finger contacting said motion path is located between said parking region and said disk media surface.

11. The apparatus of claim 9,
wherein said parking region is located between said convex finger contacting said motion path and said disk media surface.

12. A disk drive, comprising:
said loading ramp of claim 8;
said head suspension assembly;
wherein said loading ramp is used to park said read-write head in said parking zone.

13. The apparatus of claim 8,
wherein said loading ramp is located inside of said disk media surface.

14. The apparatus of claim 8,
wherein said loading ramp is located outside of said disk media surface.

* * * * *